(12) United States Patent
Nguyen et al.

(10) Patent No.: US 8,267,176 B2
(45) Date of Patent: Sep. 18, 2012

(54) FORMATION CONDITIONING FLUIDS COMPRISING PEROXIDES AND METHODS RELATING THERETO

(75) Inventors: Philip D. Nguyen, Duncan, OK (US); Ronald G. Dusterhoft, Katy, TX (US); Bhadra Desai, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 414 days.

(21) Appl. No.: 12/641,162

(22) Filed: Dec. 17, 2009

(65) Prior Publication Data

US 2011/0146997 A1    Jun. 23, 2011

(51) Int. Cl.
- *E21B 33/138* (2006.01)
- *E21B 37/00* (2006.01)
- *C09K 8/56* (2006.01)
- *C09K 8/94* (2006.01)

(52) U.S. Cl. ........ 166/295; 166/285; 166/292; 166/294; 166/305.1; 166/309; 166/312; 507/202; 507/269; 507/277

(58) Field of Classification Search .................. None
See application file for complete search history.

(56) References Cited

U.S. PATENT DOCUMENTS

| | | | |
|---|---|---|---|
| 3,858,655 A | | 1/1975 | Engle et al. |
| 5,783,526 A | * | 7/1998 | Dobson et al. ............... 507/261 |
| 6,138,760 A | * | 10/2000 | Lopez et al. .................. 166/300 |
| 6,267,186 B1 | * | 7/2001 | Hayatdavoudi ................ 175/64 |
| 7,093,658 B2 | | 8/2006 | Chatterji et al. |
| 7,392,847 B2 | | 7/2008 | Gatlin et al. |
| 7,727,936 B2 | * | 6/2010 | Pauls et al. .................... 507/213 |
| 2006/0090895 A1 | * | 5/2006 | Chatterji et al. .............. 166/278 |
| 2008/0035338 A1 | * | 2/2008 | Pauls et al. .................... 166/278 |
| 2008/0305971 A1 | * | 12/2008 | Li et al. ........................... 507/90 |
| 2009/0042750 A1 | * | 2/2009 | Pauls et al. .................... 507/213 |
| 2009/0137432 A1 | * | 5/2009 | Sullivan et al. ............... 507/219 |

OTHER PUBLICATIONS

International Search Report and Written Opinion for PCT/US2011/021579 dated May 12, 2011.

* cited by examiner

*Primary Examiner* — George Suchfield

(74) *Attorney, Agent, or Firm* — Robert A. Kent; McDermott Will & Emery LLP

(57) ABSTRACT

Of the methods provided herein, is a method comprising: providing a clean-up fluid comprising a peroxide-generating compound and an aqueous base fluid; placing the clean-up fluid in a subterranean formation; removing contaminants from at least a portion of the subterranean formation to form a cleaned portion of the formation; providing a consolidation agent; placing the consolidation agent on at least a portion of the cleaned portion of the formation; and allowing the consolidation agent to adhere to at least a plurality of unconsolidated particulates in the cleaned portion of the formation.

19 Claims, No Drawings

FORMATION CONDITIONING FLUIDS COMPRISING PEROXIDES AND METHODS RELATING THERETO

BACKGROUND

The present invention relates to enhancing the production of hydrocarbons from a subterranean formation. More particularly, the invention relates to formation conditioning fluids comprising peroxide generating compounds and their methods of use relative to enhancing the placement and performance of consolidating agents in subterranean formations.

Hydrocarbon wells are often located in subterranean formations that contain unconsolidated particulates (e.g., sand, gravel, proppant, fines, etc.) that may migrate out of the subterranean formation with the oil, gas, water, and/or other fluids produced by the wells. The presence of such particulates in produced fluids is undesirable in that the particulates may abrade pumping and other producing equipment and/or reduce the production of desired fluids from the well. Moreover, particulates that have migrated into a well bore (e.g., inside the casing and/or perforations in a cased hole), among other things, may clog portions of the well bore, hindering the production of desired fluids from the well. The term "unconsolidated particulates," and derivatives thereof, is defined herein to include loose particulates and particulates bonded with insufficient bond strength to withstand the forces created by the production of fluids through the formation.

Unconsolidated particulates may comprise, among other things, sand, gravel, fines and/or proppant particulates in the subterranean formation, for example, proppant particulates placed in the subterranean formation in the course of a fracturing or gravel-packing operation. The terms "unconsolidated subterranean formations," "unconsolidated portions of a subterranean formation," and derivatives thereof are defined herein to include any formations that contain unconsolidated particulates, as that term is defined herein.

One method used to control particulates in unconsolidated formations involves consolidating unconsolidated particulates into stable, permeable masses by applying a consolidating agent (e.g., a resin or tackifying agent) to a portion of the subterranean formation. The application of such resins or tackifying agents is often referred to as a consolidation treatment. One problem that may be experienced in such consolidation treatments is the failure of the resin or tackifying agent to adhere to the rock surfaces of the formation. This failure may be due to the presence of oil, condensates, or other debris (collectively referred to herein as "contaminants") on the rock surfaces.

To combat this contaminants problem, oftentimes the formation may be pretreated with a mutual solvent prior to the consolidation treatment in an attempt to remove the oil and/or the debris and prepare the surface of the formation rock in the formation to allow the resin or tackifier to adhere to its surface. Glycol ethers are an example of the type of solvent that may be used in such pre-treatments. The use of such solvents is very expensive because high concentrations of the solvent are necessary to achieve any sort of contaminant reduction. For example, it is often recommended that solutions comprising about 50% to about 100% of the solvent be used in relatively large pre-treatments. Additionally, many of these solvents present toxicity and handling concerns.

SUMMARY

The present invention relates to enhancing the production of hydrocarbons from a subterranean formation. More particularly, the invention relates to formation conditioning fluids comprising peroxide generating compounds and their methods of use relative to enhancing the placement and performance of consolidating agents in subterranean formations.

In one embodiment, the present invention provides a method comprising: providing a clean-up fluid comprising a peroxide-generating compound and an aqueous base fluid; placing the clean-up fluid in a subterranean formation; removing contaminants from at least a portion of the subterranean formation to form a cleaned portion of the formation; providing a consolidation agent; placing the consolidation agent on at least a portion of the cleaned portion of the formation; and allowing the consolidation agent to adhere to at least a plurality of unconsolidated particulates in the cleaned portion of the formation.

In one embodiment, the present invention provides a method comprising: providing a clean-up fluid comprising a peroxide-generating compound and an aqueous base fluid; placing the clean-up fluid in a subterranean formation; allowing the clean-up fluid to penetrate a portion of the subterranean formation; and allowing the clean-up fluid to remove contaminants from the portion of the subterranean formation to form a cleaned portion of the subterranean formation, wherein the cleaned portion of the formation comprises at least a plurality of cleaned flow paths.

The features and advantages of the present invention will be readily apparent to those skilled in the art. While numerous changes may be made by those skilled in the art, such changes are within the spirit of the invention.

DESCRIPTION OF THE PREFERRED EMBODIMENTS

The present invention relates to enhancing the production of hydrocarbons from a subterranean formation. More particularly, the invention relates to formation conditioning fluids comprising peroxide generating compounds and their methods of use relative to enhancing the placement and performance of consolidating agents in subterranean formations.

Of the many advantages of the formation conditioning fluids of the present invention, many of which are not discussed or eluded to herein, is that through their use, the rock surfaces within the formation are in a wetted state that is amenable to allowing the resin or tackifier to stick to its surface in a subsequent consolidation treatment. The formation conditioning fluids of the present invention are very efficient at removing contaminants from the rock surfaces. When compared to standard solvent pre-treatment techniques, the efficiency improvement is marked, especially with respect to the removal or reduction in the presence of oil as well as other contaminants such as unbroken bits of fracturing gel or organic deposits that are not soluble in standard solvents. Additionally, as an added benefit, the formation conditioning fluids of the present invention allow for some stimulation effect in that they remove contaminants from pore throats to clear flow paths for hydrocarbon production. Another benefit is that these formation conditioning fluids are less expensive than solvent pre-treatments, and do not present the same sort of toxicity or handling concerns. Perhaps a key advantage is the amenability to these formation conditioning fluids to being foamed; conventional solvent pre-treatment fluids are not amenable to foaming because of the inherent incompatibility of the foaming agent and the solvent. This allows the fluids to be used over long intervals within a well bore in the formation. Additionally, foaming the fluids can be viewed as extending the fluids so that a relatively small volume of fluid can have a large bottom hole volume making it possible to contact larger reservoir sections with smaller treatments. Foamed embodiments of the fluids of the present invention also may act as diverting agents to help provide more uniform matrix placement of the chemicals into the reservoir over long intervals, which may overcome the effects of variable permeabilities.

The clean-up fluids of the present invention comprise an aqueous base fluid and a peroxide-generating compound. Optionally, the clean-up fluids may comprise a foaming agent and a gas. Additional components also may be included as described below.

In the methods of the present invention, it is believed that the peroxide-generating compounds react to generate heat, oxygen, and other compounds such as water that may be used to clean the sand surfaces in the formation and remove contaminants that may otherwise clog flow paths in the rock matrix or coat on the surfaces of the sand particulates. For example, the decomposition of the hydrogen peroxide into oxygen and water generates a considerable amount of heat (i.e., approximately 23 Kcal/gm-mole of $H_2O_2$), and liberates oxygen that may react further with any oil residue or debris present in the subterranean formation to generate carbon dioxide and additional amounts heat and water. Depending on the concentration of the hydrogen peroxide, the water generated by the two reactions, along with the water already present in the formation conditioning fluid, may generate steam and/or hot water that itself may reduce the viscosity of the adjacent hydrocarbons. The viscosity of the adjacent hydrocarbons may also be reduced by the miscible solution of carbon dioxide generated by the reaction of oxygen with hydrocarbons in the formation, into hydrocarbons in the cooler regions of the reservoir. The heat generated by the various reactions may also facilitate the release of hydrocarbons from the formation.

Optionally, the clean-up fluids may be foamed with a foaming agent and a gas. In such embodiments, the clean-up fluids also comprise a gas and a foaming agent. While various gases can be utilized for foaming the treatment fluids of this invention, nitrogen, carbon dioxide, and mixtures thereof are preferred. In examples of such embodiments, the gas may be present in a treatment fluid in an amount in the range of from about 5% to about 95% by volume of the treatment fluid, and more preferably in the range of from about 20% to about 80%. The amount of gas to incorporate into the fluid may be affected by factors including the viscosity of the fluid and wellhead pressures involved in a particular application. Examples of preferred foaming agents that can be utilized to foam and stabilize the fluids of this invention include, but are not limited to, alkylamidobetaines such as cocoamidopropyl betaine, alpha-olefin sulfonate, trimethyltallowammonium chloride, $C_8$ to $C_{22}$ alkylethoxylate sulfate, trimethylcocoammonium chloride, any derivative of any of the foregoing, and any combination of the foregoing. Cocoamidopropyl betaine is especially preferred. Other suitable surfactants available from Halliburton Energy Services include, but are not limited to: "19N™," "G-Sperse Dispersant," "Morflo III®" surfactant, "Hyflo® IV M" surfactant, "Pen-88M™" surfactant, "HC-2™ Agent," "Pen-88 HT™" surfactant, "SEM-7™" emulsifier, "Howco-Suds™" foaming agent, "Howco Sticks™" surfactant, "A-Sperse™" dispersing aid for acid additives, "SSO-21E" surfactant, and "SSO-21MW™" surfactant. Other suitable foaming agents and foam stabilizing agents may be included as well, which will be known to those skilled in the art with the benefit of this disclosure. The foaming agent is generally present in fluid of the present invention in an amount in the range of from about 0.1% to about 5% w/v, more preferably in the amount of from about 0.2% to about 1% w/v, and most preferably about 0.5%.

The peroxide-generating compounds suitable for use in the present invention may include any peroxide or peroxide-generating compound. One suitable peroxide-generating compound is hydrogen peroxide. Another is sodium percarbonate (or sodium carbonate peroxyhydrate), a granular product used as an alternative to perborate bleaches in household detergents that, when dissolved into water, releases $H_2O_2$ and soda ash (sodium carbonate). The pH of the resulting solution is typically alkaline, which activates the $H_2O_2$. Additional suitable peroxide-generating compounds include, but are not limited to, pentanedione peroxide, calcium peroxide, dichromates, permanganates, peroxydisulfates, sodium perborate, sodium carbonate peroxide, hydrogen peroxide, tertiarybutylhydroperoxide, potassium diperphosphate, and ammonium and alkali metal salts of dipersulfuric acid, alkali and alkaline earth percarbonates and persulfates and perchlorates. Specific examples include, but are not limited to, ammonium and alkali and alkaline earth persulfates such as ammonium, sodium and potassium persulfate. Additional examples include, but are not limited to, cumene hydroperoxide, t-butyl cumyl peroxide, di-t-butyl peroxide, di-(2-t-butylperoxyisopropyl)benzene, 2,5-dimethyl-2,5-di(t-butylperoxy)hexane, di-isopropylbenzene monohydroperoxide, di-cumylperoxide, 2,2-di-(t-butyl peroxy) butane, t-amyl hydroperoxide, benzoyl peroxide, any derivative of any of the foregoing, and any combination of the foregoing. Any combination of these suitable peroxide-generating compounds is suitable as well. Other suitable peroxide-generating compounds will be apparent to one skilled in the art, with the benefit of this disclosure.

Typically, the peroxide-generating compound is present in the treatment fluids of the present invention in an amount in the range of from about 0.1% to about 10% w/v. In particular embodiments, the peroxide-generating compound may be present in the treatment fluids in an amount in the range of from about 1% to about 5% w/v.

As mentioned above, peroxide-generating compounds may have a propensity to prematurely decompose spontaneously or react in the well bore environment. These reactions may be affected by many factors, including, inter alia, temperature, pH, concentration, and the presence of potential catalysts. For example, the decomposition of the peroxide-generating compound may be hastened by raising the temperature, adjusting the pH to 7.0 or greater, or introducing decomposition catalysts, such as salts of iron, nickel, cobalt, or certain other metals. Generally, the rate of decomposition increases approximately 2.2 times for each approximate 10° C. rise in temperature in the range from about 20° C. to about 100° C., and about 1.5 times for each 10° F. rise from 68° F. to 212° F. Generally, decreasing temperatures have little effect on hydrogen peroxide until they drop substantially below 0° C. Crystals do not begin to appear in 35% and 50% solutions of hydrogen peroxide until about −33° C. (−27.4° F.) and −52.2° C. (−62° F.), respectively.

Particular embodiments of the present invention may employ one or more mechanical means to minimize the decomposition of the peroxide-generating compound until the compound is down hole. Generally, the holding tanks, pumps, and the like used to handle the peroxide-generating compound prior to its injection into the subterranean formation are constructed out of passivated, corrosion-resistant materials, such as stainless steel, specifically selected to minimize the decomposition of the hydrogen peroxide. Particular embodiments of the present invention may also mechanically isolate the peroxide-generating compound from the well bore environment itself until the compound reaches a desired location in the subterranean formation. In particular embodiments, this entails injecting the peroxide-generating compound into the formation using coiled tubing constructed from a material selected for its compatibility both with the corrosive demands of the peroxide-generating compound and with the physical demands placed on coiled tubing. Such compatible coiled tubing materials include, but are not limited to, QT 16Cr alloys, such as QT 16Cr30 and QT 16Cr80, available under the tradename "NITRONIC® 30," from Quality Tubing, Inc., of Houston, Tex. Other particular embodiments may employ other corrosion-resistant tubing, such as pure aluminum tubing, Type 304 stainless steel tubing, plastic-lined steel tubing, or tubing lined with crosslinked polyethylene (PEX), polyethylene, or some other peroxide-inert material.

Either alone or in combination with mechanical means, particular embodiments of the present invention may also use chemical means to minimize the decomposition of the peroxide-generating compound until the peroxide-generating compound reaches the desired location in the subterranean formation. Generally, these embodiments use a moderator to delay the decomposition of the peroxide-generating compound and may further use an initiator to catalyze the reaction once the peroxide-generating compound is in place in the formation.

Several methods are available for determining whether the minerals present in the formation are sufficient to initiate the reaction of the peroxide-generating compound. Generally, a sample of the formation is exposed to the peroxide-generating compound. If the peroxide-generating compound is too reactive with the formation, a moderator may be added. Moderator is added until the about 95% of the peroxide-generating compound remains unconsumed after a 24-hour period. In some embodiments, this level of moderator may then be scaled up by up by about 20% to ensure an adequate amount of moderator is present to prevent the premature decomposition of the peroxide-generating compound. With the benefit of this disclosure, one skilled in the art should be able to determine the proper amount of moderator for use in chosen formation. In some embodiments of the present invention, a moderator or moderators are included in concentrations of from about 10 mg of moderator per liter of hydrogen peroxide solution to about 500 mg of moderator per liter of hydrogen peroxide solution; however, when it is desired to all but completely stop the reaction, moderator may be included in concentrations of multiple grams of moderator per liter of hydrogen peroxide solution, for example, some embodiments may use 2 grams of moderator per liter of hydrogen peroxide solution. In other embodiments of the present invention, a moderator or moderators are included in concentrations of from about 25 mg of moderator per liter of hydrogen peroxide solution to about 250 mg of moderator per liter of hydrogen peroxide solution.

Optionally, the clean-up fluids of the present invention may comprise surfactants, mutual solvents, oxidants, chelating agents, any derivative of any of the foregoing, acids (both inorganic and organic), any derivative of any of the foregoing, and any combination of the foregoing.

Surfactants that are suitable for use in the clean-up fluids of the present invention include, but are not limited to, non-ionic ethoxylated surfactants. Those that are especially suitable have about 3 to about 12 moles of ethylene oxide, such as nonylphenol ethoxylates comprising from about 4 moles to about 10.5 moles of ethylene oxide. A commercially available example of a suitable surfactant is "BEROL® 226 SA," available from Akzo Nobel in various locations. A commercially available product that is suitable that provides both carbonate peroxyhydrate and ethoxylated surfactant is "OXICLEAN®" available from Church & Dwight, Inc. If used, the surfactant may be included in an amount of from about 0.1% to about 4% w/v.

Examples of suitable mutual solvents include, but are not limited to, ethylene glycol monobutyl ether, 1-methoxy-2-propanol, dipropylene glycol methyl ether, dipropylene glycol dimethyl ether, diethyleneglycol methyl ether, ethyleneglycol butyl ether, and diethyleneglycol butyl ether, propyleneglycolmonobutylether, water, methanol, isopropyl alcohol, alcohol ethers, aromatic solvents, other hydrocarbons, mineral oils, paraffins, any derivative of any of the foregoing, and any combination of the foregoing. Additional suitable mutual solvents include, but are not limited to, "MUSOL®". Mutual Solvent, "MUSOL® A" Mutual Solvent, and "MUSOL® E" Mutual Solvent, all available from Halliburton Energy Services in Duncan, Okla. Other suitable solvents may also be used. If used, the mutual solvent may be included in an amount of from about 0.1% to about 10% w/v.

Examples of suitable oxidants include, but are not limited to, alkali hypohalites and alkaline earth hypohalites such as sodium or calcium hypohalites, any derivative of any of the foregoing, and any combination of the foregoing. A specific example includes sodium hypochlorite. If used, the oxidant may be included in an amount of from about 0.1% to about 10% w/v.

Examples of suitable chelating agents include, but are not limited to, ethylene diamine tetraacetic acid, nitrilotriacetic acid, hydroxyl-ethylethylenediaminetriacetic acid, diethylenetriaminepentaacetic acid, propylenediaminetetraacetic acid, ethylenediaminedi(o-hydroxyphenylacetic) acid, a sodium or potassium salt of any of the foregoing, dicarboxymethyl glutamic acid tetrasodium salt, any derivative of any of the foregoing, and any combination of the foregoing. If used, the chelating agent may be included in an amount of from about 0.1% to about 10% w/v.

In alternative embodiments, if it is desirable to increase the viscosity of the formation conditioning fluid, a viscoelastic surfactant may be included. Suitable viscoelastic surfactants that may be suitable include, but are not limited to, methyl ester sulfonates, sulfosuccinates, taurates, amine oxides, ethoxylated amines, alkoxylated fatty acids, alkoxylated alcohols, lauryl alcohol ethoxylate, ethoxylated nonyl phenol, ethoxylated fatty amines, cocoalkylamine ethoxylate, betaines, modified betaines, alkylamidobetaines, cocoamidopropyl betaine, quaternary ammonium compounds, trimethyltallowammonium chloride, trimethylcocoaammonium chloride, an ammonium salt of an alkyl ether sulfate, a cocoamidopropyl dimethylamine oxide, cocoamidopropyl hydroxysultaine, tallow dihydroxyethyl betaine, any derivative of any of the foregoing, and any combination of the foregoing.

In one embodiment, the present invention provides a method comprising: providing a clean-up fluid comprising a peroxide-generating compound and an aqueous base fluid; placing the clean-up fluid in a subterranean formation; removing contaminants from at least a portion of the subterranean formation to form a cleaned portion of the formation; providing a consolidation agent; placing the consolidation agent on at least a portion of the cleaned portion of the formation; and allowing the consolidation agent to adhere to at least a plurality of unconsolidated particulates in the cleaned portion of the formation. The term "cleaned" as used herein does not imply any particular degree of contaminant removal in that portion of the formation.

Suitable consolidation agents include resins and tackifiers. In some embodiments, these consolidation agents may be used in the form of an emulsion. In such embodiments, the emulsion may comprise an aqueous base fluid and a suitable surfactant.

Resins suitable for use in the consolidation fluids of the present invention include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use in the present invention. Some preferred solvents are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, butyl alcohol, d'limonene, fatty acid methyl esters, and any derivative of any of the foregoing, and any combination of the foregoing. Other preferred solvents include aqueous dissolvable solvents such as, methanol, isopropanol, butanol, glycol ether solvents, and any derivative of any of the foregoing, and any combination of the foregoing. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

In some embodiments, compositions suitable for use as tackifying agents in the present invention may comprise any compound that, when in liquid form or in a solvent solution, will form a tacky, non-hardening coating upon a particulate. Tackifying agents suitable for use in the present invention include non-aqueous tackifying agents; aqueous tackifying agents; silyl-modified polyamides, and reaction products of an amine and a phosphate ester. In addition to encouraging particulates to form aggregates, the use of a tackifying agent may reduce particulate flow back once the particulates are placed into a subterranean formation. The tackifying agents are preferably coated on the particulates in an amount ranging from about 0.1% to about 5% by weight of the uncoated particulates, preferably ranging from about 0.5% to about 2.5% by weight of the uncoated particulates.

One type of tackifying agent suitable for use in the present invention is a non-aqueous tackifying agent. A particularly preferred group of tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac and the like. Other suitable non-aqueous tackifying agents are described in U.S. Pat. No. 5,853,048 issued to Weaver, et al. and U.S. Pat. No. 5,833,000 issued to Weaver, et al., the relevant disclosures of which are herein incorporated by reference.

Non-aqueous tackifying agents suitable for use in the present invention may be either used such that they form non-hardening coating or they may be combined with a multifunctional material capable of reacting with the non-aqueous tackifying agent to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the non-aqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and any derivative of any of the foregoing, and any combination of the foregoing. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510 issued to Weaver, et al., the relevant disclosure of which is herein incorporated by reference. Other suitable tackifying agents are described in U.S. Pat. No. 5,853,048 issued to Weaver, et al., the relevant disclosure of which is herein incorporated by reference.

Solvents suitable for use with the non-aqueous tackifying agents of the present invention include any solvent that is compatible with the non-aqueous tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and any derivative of any of the foregoing, and any combination of the foregoing. It is within the ability of one skilled in the art, with the benefit of this disclosure, to determine whether a solvent is needed to achieve a viscosity suitable to the subterranean conditions and, if so, how much.

Aqueous tackifying agents suitable for use in the present invention are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pre-treatment may be first contacted with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifying agent may enhance the grain-to-grain contact between the individual particulates within the formation (be they proppant particulates, formation fines, or other particulates), helping bring about the consolidation of the particulates into a cohesive, flexible, and permeable mass.

Suitable aqueous tackifying agents include any polymer that can bind, coagulate, or flocculate a particulate. Also, polymers that function as pressure sensitive adhesives may be suitable. Examples of aqueous tackifying agents suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly (butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers, any derivative of any of the foregoing, and any combination of the foregoing. The term "derivative" as used herein refers to any compound that is made from one of the listed compounds, for example, by replacing one atom in the base compound with another atom or group of atoms. Methods of determining suitable aqueous tackifying agents and additional disclosure on aqueous tackifying agents can be found in Published U.S. Patent Application Number 2005-0277554 and Published U.S. Patent Application Number 2005-0274517, the relevant disclosures of which are hereby incorporated by reference.

Some suitable aqueous tackifying agents are described in U.S. Pat. No. 5,249,627 by Harms, et al., the relevant disclosure of which is incorporated by reference. Harms discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% $C_{1-30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophilic monomers may be any monomer that will provide polar oxygen-containing or nitrogen-containing groups. Suitable hydrophillic monomers include dialkyl amino alkyl (meth)acrylates and their quaternary addition and acid salts, acrylamide, N-(dialkyl amino alkyl)acrylamide, methacrylamides and their quaternary addition and acid salts, hydroxy alkyl (meth)acrylates, unsaturated carboxylic acids such as methacrylic acid or preferably acrylic acid, hydroxyethyl acrylate, acrylamide, and the like. These copolymers can be made by any suitable emulsion polymerization technique. Methods of producing these copolymers are disclosed, for example, in U.S. Pat. No. 4,670,501, the relevant disclosure of which is incorporated herein by reference.

[[[Silyl-Modified Polyamide Tackifying Agents.]]]

Silyl-modified polyamide compounds suitable for use as a tackifying agent in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

Yet another tackifying agent suitable for use in the present invention is a reaction product of an amine and a phosphate ester such as those describes in U.S. Pat. No. 7,392,847 issued to Gatlin et al., the relevant disclosure of which is herein incorporated by reference. The ratio of amine to phosphate ester combined to create the reaction product tackifying agent is preferably from about 1:1 to about 5:1, more preferably from about 2:1 to about 3:1. In some embodiments it may be desirable to combine the amine and phosphate ester in the presence of a solvent, such as methanol.

To create these amine/phosphate ester tackifying agents, suitable amines include, without limitation, any amine that is capable of reacting with a suitable phosphate ester to form a composition that forms a deformable coating on a metal-oxide-containing surface. Exemplary examples of such amines include, without limitation, any amine of the general formula $R^1$, $R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or any derivative of any of the foregoing, and any combination of the foregoing.

For the phosphate ester component of the amine/phosphate ester tackifying agents, suitable phosphate esters include, without limitation, any phosphate ester that is capable of reacting with a suitable amine to form a composition that forms a deformable coating on a metal-oxide containing surface or partially or completely coats particulate materials. Exemplary examples of such phosphate esters include, without limitation, any phosphate esters of the general formula $P(O)(OR^3)(OR^4)(OR^5)$ or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters include, without limitation, phosphate ester of alkanols having the general formula $P(O)(OH)_x(OR^6)_y$, where x+y=3 and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof. Other exemplary examples of phosphate esters include, without limitation, phosphate esters of alkanol amines having the general formula $N[R^7OP(O)(OH)_2]_3$ where $R^7$ is a carbonyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof. Other exemplary examples of phosphate esters include, without limitation, phosphate esters of hydroxylated aromatics such as phosphate esters of alkylated phenols such as Nonylphenyl phosphate ester or phenolic phosphate esters. Other exemplary examples of phosphate esters include, without limitation, phosphate esters of diols and polyols such as phosphate esters of ethylene glycol, propylene glycol, or higher glycolic structures. Other exemplary phosphate esters include any phosphate ester than can react with an amine and coated on to a substrate forms a deformable coating enhancing the aggregating potential of the substrate.

Multifunctional materials suitable for use in the present invention include, but are not limited to, aldehydes, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde, aldehyde condensates, and silyl-modified polyamide compounds and the like, and combinations thereof. Suitable silyl-modified polyamide compounds that may be used in the present invention are those that are substantially self-hardening compositions capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water.

In some embodiments of the present invention, the multifunctional material may be mixed with a tackifying compound in an amount of from about 0.01% to about 50% by weight of the tackifying compound to effect formation of the reaction product. In other embodiments, the compound is present in an amount of from about 0.5% to about 1% by weight of the tackifying compound. Suitable multifunctional materials are described in U.S. Pat. No. 5,839,510 issued to Weaver, et al., the relevant disclosure of which is herein incorporated by reference.

In embodiments where the consolidating agent is used in an emulsion form, the consolidating agent emulsions of the present invention comprise an aqueous fluid, a surfactant, and a consolidating agent. These consolidating agent emulsions have water external phases and oil internal phases. Suitable consolidating agents for the emulsion embodiments comprise all of the consolidating agents listed above. The consolidating agent may be present in an amount in the range from about 0.1% to about 10% by weight of the composition. The surfactant is preferably present in the consolidating agent emulsion in an amount in the range from about 0.1% to 10% by weight of the composition. The balance of the fluid is the aqueous base fluid (e.g., 40% to 97% by weight of the consolidating agent emulsion composition). Suitable emulsions are described in U.S. Patent Publication No. 20070187097, the disclosure of which is hereby incorporated by reference.

Suitable aqueous fluids that may be used in the consolidating agent emulsions embodiments of the present invention include fresh water, salt water, brine, seawater, or any other aqueous fluid that, preferably, does not adversely react with the other components used in accordance with this invention or with the subterranean formation. One should note, however, that if long-term stability of the emulsion is desired, the preferred aqueous fluid is one that is substantially free of salts. It is within the ability of one skilled in the art with the benefit of this disclosure to determine if and how much salt may be tolerated in the consolidating agent emulsions of the present invention before it becomes problematic for the stability of the emulsion. Surfactants that may be suitable in the emulsion embodiments are those that are capable of emulsifying an oil-based component in a water-based component so that the emulsion has a water external phase and an oil internal phase. A preferred surfactant is an amine surfactant. Such preferred amine surfactants include, but are not limited to, amine ethoxylates and amine ethoxylated quaternary salts such as tallow diamine and tallow triamine exthoxylates and quaternary salts. Examples of suitable surfactants are ethoxylated $C_{12}$-$C_{22}$ diamine, ethoxylated $C_{12}$-$C_{22}$ triamine, ethoxylated $C_{12}$-$C_{22}$ tetraamine, ethoxylated $C_{12}$-$C_{22}$ diamine methylchloride quat, ethoxylated $C_{12}$-$C_{22}$ triamine methylchloride quat, ethoxylated $C_{12}$-$C_{22}$ tetraamine methylchloride quat, ethoxylated $C_{12}$-$C_{22}$ diamine reacted with sodium chloroacetate, ethoxylated $C_{12}$-$C_{22}$ triamine reacted with sodium chloroacetate, ethoxylated $C_{12}$-$C_{22}$ tetraamine reacted with sodium chloroacetate, ethoxylated $C_{12}$-$C_{22}$ diamine acetate salt, ethoxylated $C_{12}$-$C_{22}$ diamine hydrochloric acid salt, ethoxylated $C_{12}$-$C_{22}$ diamine glycolic acid salt, ethoxylated $C_{12}$-$C_{22}$ diamine DDBSA salt, ethoxylated $C_{12}$-$C_{22}$ triamine acetate salt, ethoxylated $C_{12}$-$C_{22}$ triamine hydrochloric acid salt, ethoxylated $C_{12}$-$C_{22}$ triamine glycolic acid salt, ethoxylated $C_{12}$-$C_{22}$ triamine DDBSA salt, ethoxylated $C_{12}$-$C_{22}$ tetraamine acetate salt, ethoxylated $C_{12}$-$C_{22}$ tetraamine hydrochloric acid salt, ethoxylated $C_{12}$-$C_{22}$ tetraamine glycolic acid salt, ethoxylated $C_{12}$-$C_{22}$ tetraamine DDBSA salt, pentamethylated $C_{12}$-$C_{22}$ diamine quat, heptamethylated $C_{12}$-$C_{22}$ diamine quat, nonamethylated $C_{12}$-$C_{22}$ diamine quat, and combinations thereof.

In some embodiments of the present invention the amine surfactant may have the general formula: wherein R is a $C_{12}$-$C_{22}$ aliphatic hydrocarbon; R' is independently selected from hydrogen or $C_1$ to $C_3$ alkyl group; A is NH or O, and x+y has a value greater than or equal to one but also less than or equal to three. Preferably the R group is a non-cyclic aliphatic. In some embodiments, the R group contains at least one degree of unsaturation that is to say at least one carbon-carbon double bond. In other embodiments the R group may be a commercially recognized mixture of aliphatic hydrocarbons such as soya, which is a mixture of $C_{14}$ to $C_{20}$ hydrocarbons, or tallow which is a mixture of $C_{16}$ to $C_{20}$ aliphatic hydrocarbons, or tall oil which is a mixture of $C_{14}$ to $C_{18}$ aliphatic hydrocarbons. In other embodiments, one in which the A group is NH, the value of x+y is preferably two with x having a preferred value of one. In other embodiments in which the A group is O, the preferred value of x+y is two with the value of x being preferably one. One example of a commercially available amine surfactant is TER 2168 Series available from Champion Chemicals located in Fresno, Tex. Other commercially available examples include Ethomeen T/12 a diethoxylated tallow amine; Ethomeen S/12 a diethoxylated soya amine; Duomeen O a N-oleyl-1,3-diaminopropane, Duomeen T a N-tallow-1,3-diaminopropane, all of which are available from Akzo Nobel.

In other embodiments, the surfactant is a tertiary alkyl amine ethoxylate (a cationic surfactant). Triton RW-100 surfactant (X and Y=10 moles of ethylene oxide) and Triton RW-150 surfactant (X and Y=15 moles of ethylene oxide) are examples of tertiary alkyl amine ethoxylates that may be purchased from Dow Chemical Company.

In other embodiments, the surfactant is a combination of an amphoteric surfactant and an anionic surfactant. The relative amounts of the amphoteric surfactant and the anionic surfactant in the surfactant mixture are from about 30 to about 45% by weight of the surfactant mixture and from about 55 to about 70% by weight of the surfactant mixture, respectively. The amphoteric surfactant may be lauryl amine oxide, a mixture of lauryl amine oxide and myristyl amine oxide (i.e., a lauryl/myristyl amine oxide), cocoamine oxide, lauryl betaine, oleyl betaine, or combinations thereof, with the lauryl/myristyl amine oxide being preferred. The cationic surfactant may be cocoalkyltriethyl ammonium chloride, hexadecyltrimethyl ammonium chloride, or combinations thereof, with a 50/50 mixture by weight of the cocoalkyltriethyl ammonium chloride and the hexadecyltrimethyl ammonium chloride being preferred.

In yet other embodiments, the surfactant is a nonionic surfactant. Such preferred nonionic surfactants include, but are not limited to, alcohol oxylalkylates, alkyl phenol oxylalkylates, nonionic esters such as sorbitan esters and alkoxylates of sorbitan esters. Examples of suitable surfactants include but are not limited to, castor oil alkoxylates, fatty acid alkoxylates, lauryl alcohol alkoxylates, nonylphenol alkoxylates, octylphenol alkoxylates, tridecyl alcohol alkoxylates, such as POE-10 nonylphenol ethoxylate, POE-100 nonylphenol ethoxylate, POE-12 nonylphenol ethoxylate, POE-12 octylphenol ethoxylate, POE-12 tridecyl alcohol ethoxylate, POE-14 nonylphenol ethoxylate, POE-15 nonylphenol ethoxylate, POE-18 tridecyl alcohol ethoxylate, POE-20 nonylphenol ethoxylate, POE-20 oleyl alcohol ethoxylate, POE-20 stearic acid ethoxylate, POE-3 tridecyl alcohol ethoxylate, POE-30 nonylphenol ethoxylate, POE-30 octylphenol ethoxylate, POE-34 nonylphenol ethoxylate, POE-4 nonylphenol ethoxylate, POE-40 castor oil ethoxylate, POE-40 nonylphenol ethoxylate, POE-40 octylphenol ethoxylate, POE-50 nonylphenol ethoxylate, POE-50 tridecyl alcohol ethoxylate, POE-6 nonylphenol ethoxylate, POE-6 tridecyl alcohol ethoxylate, POE-8 nonylphenol ethoxylate, POE-9 octylphenol ethoxylate, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, POE-20 sorbitan monoisostearate ethoxylate, POE-20 sorbitan monolaurate ethoxylate, POE-20 sorbitan monooleate ethoxylate, POE-20 sorbitan monopalmitate ethoxylate, POE-20 sorbitan monostearate ethoxylate, POE-20 sorbitan trioleate ethoxylate, POE-20 sorbitan tristearate ethoxylate, POE-30 sorbitan tetraoleate ethoxylate, POE-40 sorbitan tetraoleate ethoxylate, POE-6 sorbitan hexastearate ethoxylate, POE-6 sorbitan monstearate ethoxylate, POE-6 sorbitan tetraoleate ethoxylate, and/or POE-60 sorbitan tetrastearate ethoxylate. Preferred nonionic surfactants include alcohol oxyalkyalates such as POE-23 lauryl alcohol and alkyl phenol ethoxylates such as POE (20) nonyl phenyl ether. Other applicable nonionic surfactants are esters such as sorbitan monooleate.

While cationic, amphoteric, and nonionic surfactants are preferred, any suitable emulsifying surfactant can be used. Good surfactants for emulsification typically need to be either ionic to give charge stabilization or have long groups for steric stability in water. This would include other cationic surfactants and even anionic surfactants. Examples include, but are not limited to, hexahydro-1,3,5-tris(2-hydroxyethyl) triazine, alkyl ether phosphate, ammonium lauryl sulfate, ammonium nonylphenol ethoxylate sulfate, branched isopropyl amine dodecylbenzene sulfonate, branched sodium dodecylbenzene sulfonate, dodecylbenzene sulfonic acid, branched dodecylbenzene sulfonic acid, fatty acid sulfonate potassium salt, phosphate esters, POE-1 ammonium lauryl ether sulfate, POE-1 sodium lauryl ether sulfate, POE-10 nonylphenol ethoxylate phosphate ester, POE-12 ammonium lauryl ether sulfate, POE-12 linear phosphate ester, POE-12 sodium lauryl ether sulfate, POE-12 tridecyl alcohol phosphate ester, POE-2 ammonium lauryl ether sulfate, POE-2 sodium lauryl ether sulfate, POE-3 ammonium lauryl ether sulfate, POE-3 disodium alkyl ether sulfosuccinate, POE-3 linear phosphate ester, POE-3 sodium lauryl ether sulfate, POE-3 sodium octylphenol ethoxylate sulfate, POE-3 sodium tridecyl ether sulfate, POE-3 tridecyl alcohol phosphate ester, POE-30 ammonium lauryl ether sulfate, POE-30 sodium lauryl ether sulfate, POE-4 ammonium lauryl ether sulfate, POE-4 ammonium nonylphenol ethoxylate sulfate, POE-4 nonyl phenol ether sulfate, POE-4 nonylphenol ethoxylate phosphate ester, POE-4 sodium lauryl ether sulfate, POE-4 sodium nonylphenol ethoxylate sulfate, POE-4 sodium tridecyl ether sulfate, POE-50 sodium lauryl ether sulfate, POE-6 disodium alkyl ether sulfosuccinate, POE-6 nonylphenol ethoxylate phosphate ester, POE-6 tridecyl alcohol phosphate ester, POE-7 linear phosphate ester, POE-8 nonylphenol ethoxylate phosphate ester, potassium dodecylbenzene sulfonate, sodium 2-ethyl hexyl sulfate, sodium alkyl ether sulfate, sodium alkyl sulfate, sodium alpha olefin sulfonate, sodium decyl sulfate, sodium dodecylbenzene sulfonate, sodium lauryl sulfate, sodium lauryl sulfoacetate, sodium nonylphenol ethoxylate sulfate, and/or sodium octyl sulfate.

The clean-up fluids of the present invention may also be used in other methods that are useful for subterranean applications.

In one embodiment, a method of the present invention may comprise providing a clean-up fluid comprising a peroxide-generating compound and an aqueous base fluid; placing the clean-up fluid in a subterranean formation; allowing the clean-up fluid to penetrate a portion of the subterranean formation (such as an interval of the formation, an interval comprising proppant or gravel, an interval of a propped fracture comprising a proppant pack, a section of a well bore comprising a sand control screen with or without a gravel pack, a portion of a well bore comprising a slotted or perforated liner, or a portion of a well bore comprising an expandable screen); and allowing the clean-up fluid to remove contaminants from the portion of the subterranean formation to form a cleaned portion of the subterranean formation. The cleaned portion of the formation may comprise "cleaned flow paths," which are flow paths in which contaminants have been removed from those flow paths to enable hydrocarbons to flow through them. These flow paths may be production or injection flow paths.

In one embodiment, the present invention provides a method that comprises: providing a clean-up fluid comprising a peroxide-generating compound and an aqueous base fluid; providing proppant, formation sand, fines, drill cuttings, or any solids that comprise contaminants (collectively referred to herein as "contaminated well solids"); contacting the contaminated well solids with the clean-up fluid; separating the contaminants from the well solids; and disposing of the solids.

In one embodiment, a clean-up fluid of the present invention may be injected into a well bore before a squeeze method. This method of pressure squeezing a cementitious composition into cracks and perforations is known in the art as a squeeze cementing procedure. In various embodiments, the cementitious compositions of the present teachings can be used in any commonly acceptable method of squeeze cementing. Examples of such methods can include: a "Bradenhead squeeze method," a "Spotting squeeze method" and a "Bullhead squeeze method." Common to all such methods is the introduction of a cementitious composition into the perforations in the casing, liner, or primary cementing structure under pressure. The procedure can be facilitated with various packer devices 126 commonly used in the art of remedial cementing operations. For example, such packer devices 126 can be commercially available from Baker Hughes, and Halliburton, both of Houston, Tex., United States and World Oil Tools, Inc., of Calgary, Canada. Another embodiment of the present invention provides a method comprising: introducing a peroxide-generating compound into a desired location in a subterranean formation, wherein the peroxide-generating compound further comprises a chemical moderator that acts to inhibit the reaction of the hydrogen peroxide within the subterranean formation; and later, allowing the peroxide-generating compound to generate peroxide in the desired location in the subterranean formation to remove contaminants therefrom.

To facilitate a better understanding of the present invention, the following examples of certain aspects of some embodiments are given. In no way should the following examples be read to limit, or define, the entire scope of the invention.

Examples

Below is a discussion of representative tests.

A first test was used to determine the loss-on-ignition ("LOI") value of plain, uncoated 20/40 mesh Brady sand to provide the basis value of organic material that may exist on the sand.

In a second test, heavy crude oil in the amount of 3 cc was dry coated on 100 grams of 20/40 mesh sand. The coated sand was then mixed in 100 cc of tap water and decanted. This step was repeated again one more time. LOI value was determined for this crude-oil coated sand.

In a third test, heavy crude oil in the amount of 3 cc was dry coated on 100 grams of 20/40 mesh Brady sand. The coated sand was then mixed in 100 cc of clean-up solution containing 5% w/v "OXICLEAN" for 1 minute and decanted. This step was repeated again one more time. LOI value was determined for this cleaned sand.

Table 1 below shows a summary of the LOT results of Tests 1 through 3 described above.

TABLE 1

| Test No. | Test Description | LOI % |
|---|---|---|
| 1 | Plain 20/40 Brady sand - control sample | 0.03 |
| 2 | 3% v/w heavy crude oil dry coated on 20/40 Brady sand - stirred in tap water (2 times) | 2.81 |

TABLE 1-continued

| Test No. | Test Description | LOI % |
|---|---|---|
| 5 | 3% (v/w) heavy crude oil dry coated on 20/40 Brady sand - stir in clean-up solution containing 5% w/v of "OXICLEAN" (2 times) | 0.15 |

The purpose of the next two steps is to demonstrate the effectiveness of using a clean-up fluid of the present invention to enhance the coating of a consolidation agent on to proppant (e.g., as part of a remedial proppant treatment in controlling proppant flowback). Without effective contaminant removal, it is believed that the consolidation strength resulting from resin strength is decreased.

In this test, 190 grams of 20/40 mesh Brady sand was packed in a brass flow cell. The sand pack was saturated with 100 cc of a light crude oil (>2 pore volumes of sand pack), and heated to 150° F. and held at the temperature for approximately 2 hours. A volume of 150 mL of a clean-up fluid of the invention was prepared from 3% KCl containing 5% w/v of "OXICLEAN" was injected and flushed through the sand pack with a peristatic pump at a flow rate of 20 mL/min. Next, a foam of 100 mL of 3% KCl brine containing 0.5% 19N surfactant and 0.5% "HC-2" foaming agent (both available from Halliburton Energy Services, in Duncan, Okla.) was flushed through the sand pack at 50 ml/min. Next, a foam of 100 mL of a curable, water-based resin emulsion containing 0.5% "HC-2" foaming agent was flushed through the sand pack at 50 mL/min. After the resin treatment, a volume of 50 mL of diesel was used to flush the line and flushed through the sand treated sand pack. The packed flow cell was then capped at both ends and allowed to cure at 150° F. for 3 days. After curing, the consolidated sand pack was extruded from the flow cell and cut into core sizes for unconfined compressive strength (UCS) and tensile strength measurements. The results were: UCS=845 psi, Tensile=210 psi.

In another test, 190 grams of 20/40-mesh bauxite proppant was packed in a brass flow cell. The pack was saturated with 100 cc of a heavy crude oil (>2 pore volumes of the pack) and heated to 150° F. and remained at this temperature for 2 hours. A volume of 150 mL of a clean-up fluid of the invention was prepared from 3% KCl containing 5% w/v of "OXICLEAN" was injected and flushed through the pack with a peristatic pump at a flow rate of 20 mL/min. Next, a foam of 100 mL of 3% KCl brine containing 0.5% "19N" surfactant and 0.5% "HC-2" foaming agent (both available from Halliburton Energy Services, in Duncan, Okla.) was flushed through the pack at 50 ml/min. Next, a foam of 100 mL of a curable, water-based resin emulsion containing 0.5% "HC-2" foaming agent was flushed through the sand pack at 50 mL/min. After the resin treatment, a volume of 50 mL of diesel was used to flush the line and flushed through the sand treated sand pack. The packed flow cell was then capped at both ends and allowed to cure at 150° F. for 3 days. After curing, the consolidated sand pack was extruded from the flow cell and cut into core sizes for unconfined compressive strength (UCS) and tensile strength measurements. The results were: UCS=615 psi, Tensile=240 psi.

To examine the effect of using an aqueous-based formation condition fluid in removing hydrocarbons to prepare a proppant pack, the following was performed. A water-based formation condition fluid of the present invention was used in place of a mutual solvent. This formation condition fluid was prepared in brine solution and applied as part of the first preflush to remove contaminants such as oil residue, frac-gel remnant, or any debris material that needed to be removed from the proppant pack before the subsequent preflush fluid to precondition the proppant surface for enhancing the wetting of WBR. The treatment procedure included the following steps:

Preparing 20/40-mesh Brady sand in flow cell;

Saturating proppant pack with diesel or crude oil and heating to temperature with heat tape and thermocouple, maintaining temperature during treatment;

Treating Preflush 1 by injecting two or three pore volumes of a water-based cleanup solution;

Treating Preflush 2 by injecting a foam prepared from two pore volumes of 3%-KCl brine containing 0.5% (v/v) cationic surfactant and 0.5% (v/v) foaming agent;

Treating consolidation fluid by injecting a foam prepared from two pore volumes of WBR Formulation C solution containing 0.5% (v/v) foaming agent;

Treating post-flush by injecting one pore volume of diesel; and

Curing at designed temperature and duration.

After curing, cores were obtained from the consolidated proppant packs for measurements of UCS and tensile strength. The results of this test series (Table 2) show that water-based cleanup solution effectively removed hydrocarbon, such as diesel, light and heavy crudes, with similar performance compared to that of the mutual solvent. The use of foamed WBR treatment fluid and diesel post-flush greatly enhances the consolidation performance of WBR-treated proppant packs.

TABLE 2

| Test No. | Proppant Type | Pretreatment Fluid | Treatment Temperature, ° F. | Volume of Formation Condition Fluid | Cure Temp., ° F. | Cure Time, hr | UCS, psi | Tensile, psi |
|---|---|---|---|---|---|---|---|---|
| 1 | 20/40 mesh, Brady | Diesel | 150 | 3 | 230 | 20 | 610 | 55 |
| 2 | 20/40 mesh, Brady | Diesel | 150 | 3 | 230 | 20 | 435 | 105 |
| 3 | 20/40 mesh, Brady | Diesel | 200 | None | 200 | 20 | 435 | 130 |
| 4 | 20/40 mesh, Brady | Diesel | 200 | 2 | 200 | 20 | 895 | 275 |
| 5 | 20/40 mesh, Brady | Light Crude | 150 | 3 | 150 | 72 | 845 | 210 |

TABLE 2-continued

| Test No. | Proppant Type | Pretreatment Fluid | Treatment Temperature, °F. | Volume of Formation Condition Fluid | Cure Temp., °F. | Cure Time, hr | UCS, psi | Tensile, psi |
|---|---|---|---|---|---|---|---|---|
| 6 | 20/40 mesh, bauxite | Heavy Crude | 250 | 3 | 250 | 72 | 645 | 240 |

For this test, a hydraulic fracturing treatment was simulated with the mixing and packing of proppant with crosslinked frac fluid in the flow cell, allowing the crosslinked fluid to break, removing the broken gel from the pack, and then treating the proppant pack with PropStop ABC system-.Procedure. First, 16/20 Carbolite was packed in a 45# Hybor H crosslinked fluid in brass cell. Then the crosslinked fracturing fluid was broken after 3-hour shut-in period at 250° F. Then a treatment was performed where a preflush 1 of 3% KCl containing 3% "FDP-S929-09" (available from Halliburton Energy Services, Inc.) to clean up the broken gel, and then a preflush 2 was used that contained a Foamed brine including 19N. Then a resin treatment was applied using a "Foamed FDP-S867" (available from Halliburton Energy Services) resin mixture. A postflush of diesel was then used. Then the pack was allowed to cure at 250° F. for 20 hours. The results showed a regained permeability of about 90% and a UCS of 420 psi and a tensile strength of 145 psi.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a clean-up fluid comprising an aqueous base fluid and a peroxide-generating compound selected from the group consisting of: a sodium percarbonate, a sodium carbonate peroxyhydrate, a dichromate, a permanganate, a peroxydisulfate, a potassium diperphosphate, an ammonium salt of dipersulfuric acid, an alkali metal salt of dipersulfuric acid, an alkali percarbonate, an alkaline earth percarbonate, an alkali perchlorate, an alkaline earth perchlorate, and combinations thereof;
placing the clean-up fluid in a subterranean formation;
removing contaminants from at least a portion of the subterranean formation to form a cleaned portion of the formation;
providing a consolidation agent;
placing the consolidation agent on at least a portion of the cleaned portion of the formation; and
allowing the consolidation agent to adhere to at least a plurality of unconsolidated particulates in the cleaned portion of the formation.

2. The method of claim 1 wherein the clean-up fluid is foamed and comprises a foaming agent and a gas.

3. The method of claim 2 wherein the gas is present in the clean-up fluid in an amount in the range of from about 5% to about 95% by volume of the treatment fluid and the foaming agent comprises at least one of the foaming agents chosen from the group consisting of: alkylamidobetaines, cocoamidopropyl betaine, alpha-olefin sulfonate, trimethyltallowammonium chloride, $C_8$ to $C_{22}$ alkylethoxylate sulfate, trimethylcocoammonium chloride, any derivative of any of the foregoing, and any combination of the foregoing.

4. The method of claim 1 wherein the peroxide-generating compound is present in the clean-up fluid in an amount in the range of from about 0.1% to about 10% w/v.

5. The method of claim 1 wherein the clean-up fluid comprises a surfactant, a mutual solvent, an oxidant, a chelating agent, an organic acid, an inorganic acid, a viscoelastic surfactant, any derivative of any of the foregoing, and any combination of the foregoing.

6. The method of claim 1 wherein the consolidation agent comprises a resin and/or a tackifier.

7. The method of claim 6 wherein the consolidation agent an emulsion comprises an aqueous base fluid and a surfactant.

8. The method of claim 6 wherein the consolidation agent comprises a resin chosen from the group consisting of: a two component epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin and a hybrid or copolymer thereof, a polyurethane resin and a hybrid or copolymer thereof, an acrylate resin, and any derivative thereof, and any combination thereof.

9. The method of claim 6 wherein the consolidation agent comprises a solvent chosen from the group consisting of: butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, butyl alcohol, d'limonene, fatty acid methyl esters, methanol, isopropanol, butanol, glycol ether solvents, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof, and any derivative thereof, and any combination thereof.

10. The method of claim 6 wherein the consolidation agent comprises a tackifying agent chosen from the group consisting of: a non-aqueous tackifying agent; an aqueous tackifying agent; a silyl-modified polyamide, and a reaction product of an amine and a phosphate ester.

11. The method of claim 6 wherein the consolidation agent comprises a multifunctional material chosen from the group consisting of: an aldehyde, formaldehyde, a dialdehyde, glutaraldehyde, a hemiacetal, an aldehyde releasing compound, a diacid halide, a dihalide, a dichloride, a dibromide, a polyacid anhydride, citric acid, an epoxide, a furfuraldehyde, glutaraldehyde or aldehyde condensate, and any derivative thereof, and any combination thereof.

12. The method of claim 6 wherein the consolidation agent comprises an acrylic acid polymer; an acrylic acid ester polymer; an acrylic acid derivative polymer; an acrylic acid homopolymer; an acrylic acid ester homopolymer; poly(methyl acrylate); poly(butyl acrylate); poly(2-ethylhexyl acrylate); an acrylic acid ester co-polymer; a methacrylic acid derivative polymer; a methacrylic acid homopolymer; a methacrylic acid ester homopolymer; poly(methyl methacrylate); a poly(butyl methacrylate); poly(2-ethylhexyl methacrylate); an acrylamidomethyl-propane sulfonate polymer; acrylamido-methyl-propane sulfonate derivative polymer; acrylamido-methyl-propane sulfonate co-polymer; acrylic acid/acrylamido-methyl-propane sulfonate co-polymers, and any derivative thereof, and any combination thereof.

13. The method of claim 6 wherein the consolidation agent comprises a silylmodified polyamide compound, a reaction product of an amine and a phosphate ester.

14. The method of claim 6 wherein the consolidation agent comprises an emulsion.

15. The method of claim 1 wherein the clean-up fluid comprises a surfactant, a mutual solvent, an oxidant, a chelating agent, an organic acid, an inorganic acid, a viscoelastic surfactant, any derivative of any of the foregoing, and any combination of the foregoing.

16. The method of claim 1 wherein the consolidation agent comprises a resin and/or a tackifier.

17. A method comprising:
providing a clean-up fluid comprising an aqueous base fluid and a peroxide-generating compound selected from the group consisting of: a sodium percarbonate, a sodium carbonate peroxyhydrate, a dichromate, a permanganate, a peroxydisulfate, a potassium diperphosphate, an ammonium salt of dipersulfuric acid, an alkali metal salt of dipersulfuric acid, an alkali percarbonate, an alkaline earth percarbonate, an alkali perchlorate, an alkaline earth perchlorate, and combinations thereof;
placing the clean-up fluid in a subterranean formation;
allowing the clean-up fluid to penetrate a portion of the subterranean formation; and
allowing the clean-up fluid to remove contaminants from the portion of the subterranean formation to form a cleaned portion of the subterranean formation, wherein the cleaned portion of the formation comprises at least a plurality of cleaned flow paths.

18. The method of claim 17 wherein the portion of the subterranean formation is an interval of the formation, an interval comprising proppant or gravel, an interval of a propped fracture comprising a proppant pack, a section of a well bore comprising a sand control screen with or without a gravel pack, a portion of a well bore comprising a slotted or perforated liner, or a portion of a well bore comprising an expandable screen.

19. The method of claim 17 wherein the clean-up fluid is foamed and comprises a foaming agent and a gas.

* * * * *